Nov. 30, 1926.

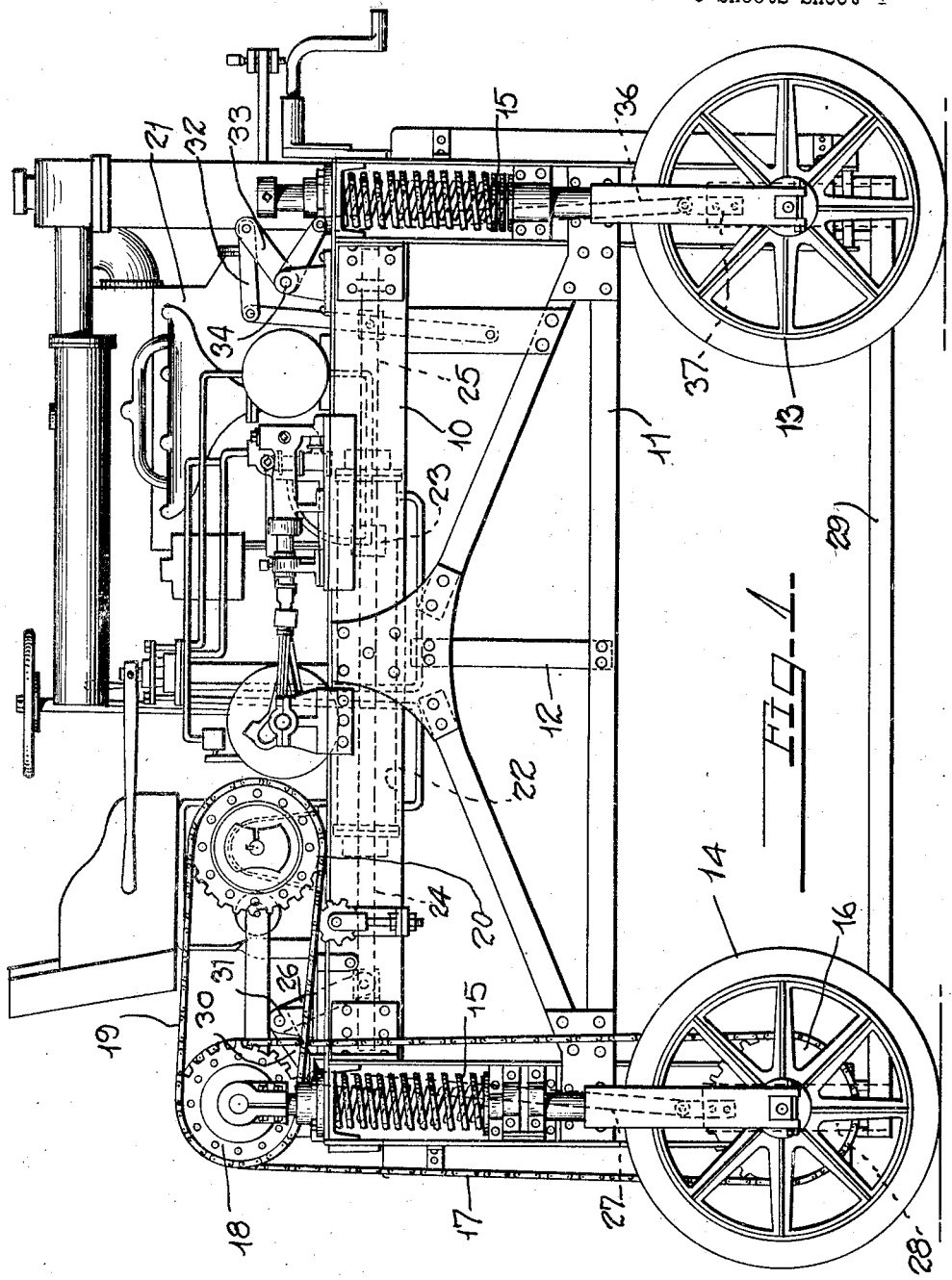

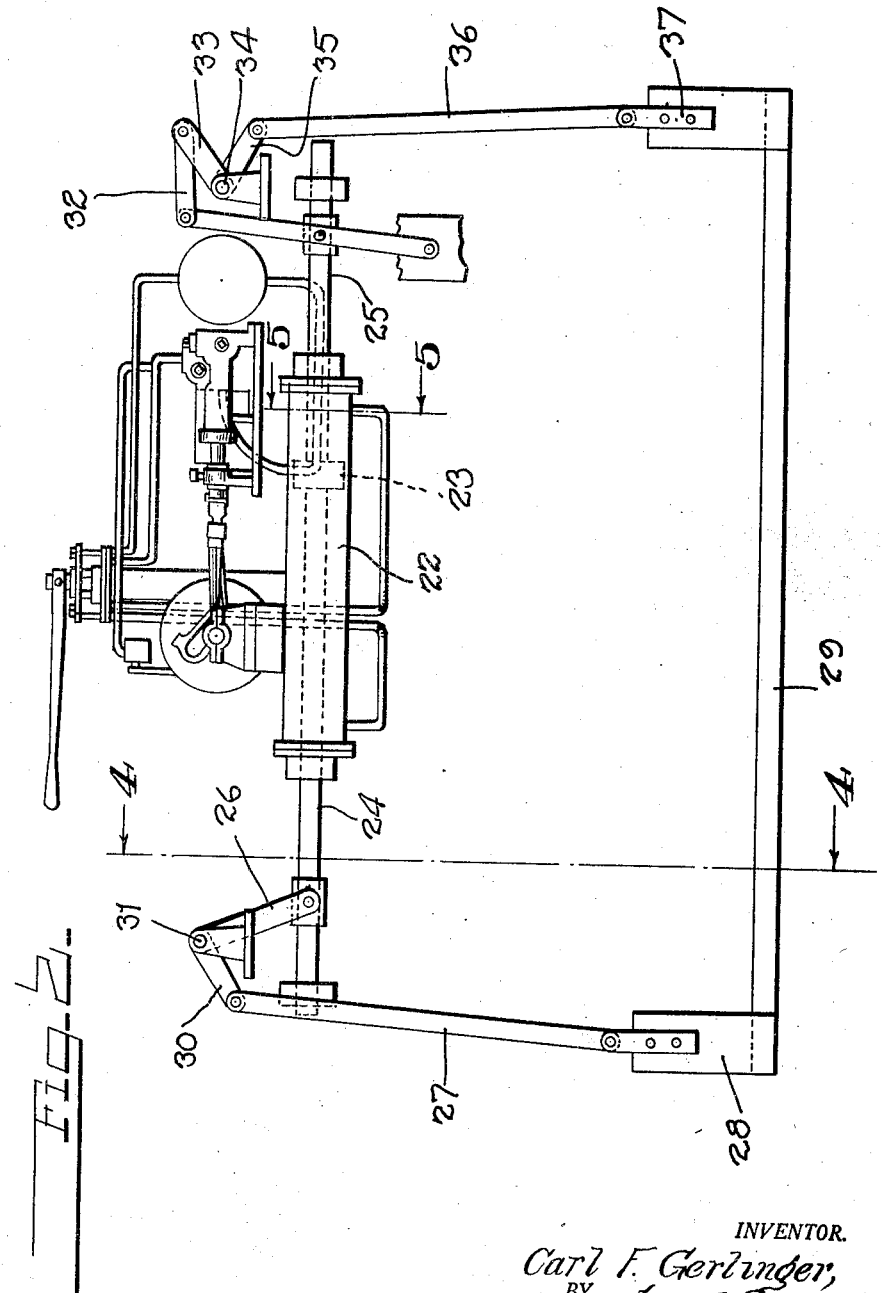

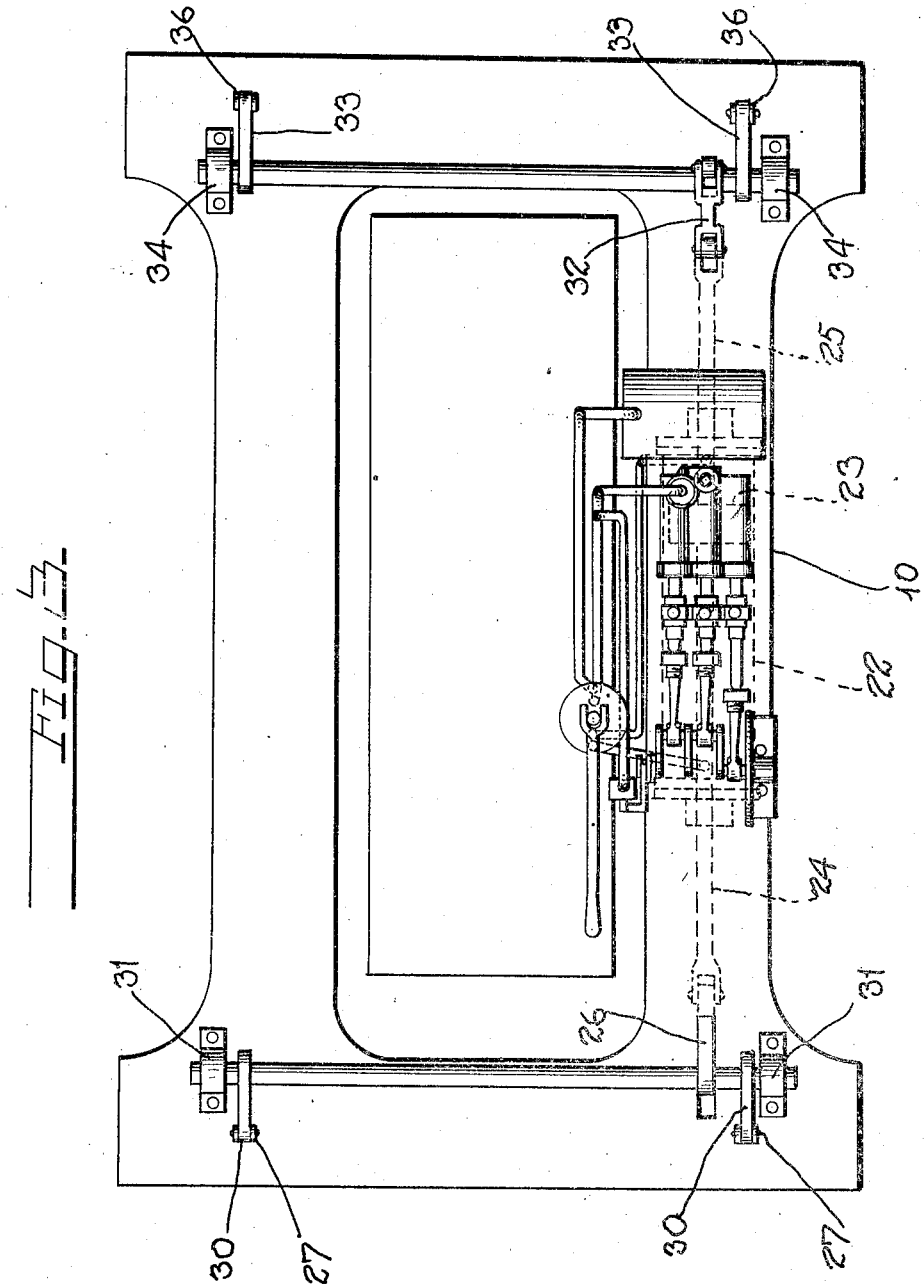

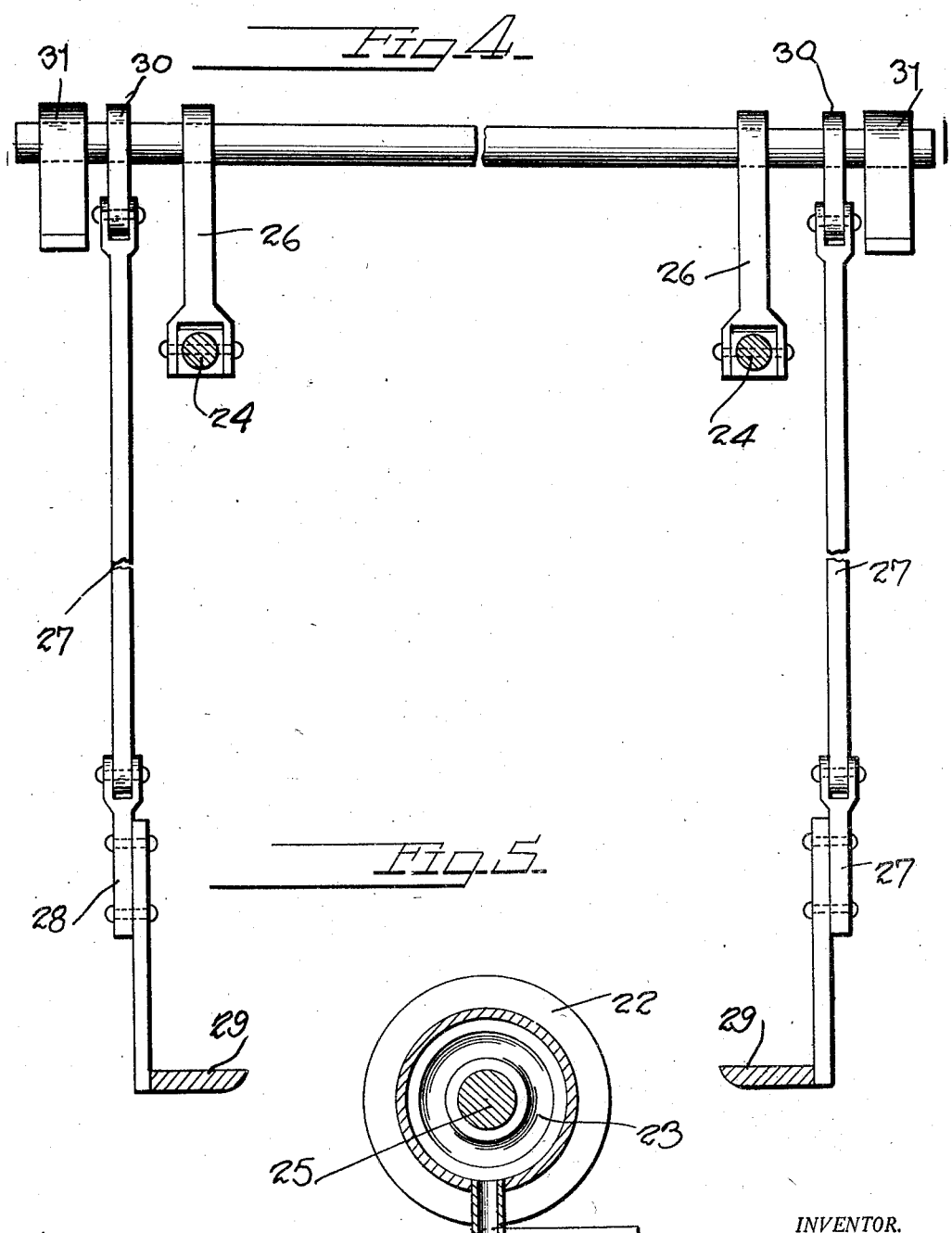

C. F. GERLINGER 1,609,018

LUMBER CARRIER

Filed Nov. 16, 1925   5 Sheets-Sheet 5

INVENTOR.
Carl F. Gerlinger.
BY
ATTORNEY

Patented Nov. 30, 1926.

1,609,018

UNITED STATES PATENT OFFICE.

CARL F. GERLINGER, OF DALLAS, OREGON.

LUMBER CARRIER.

Application filed November 16, 1925. Serial No. 69,435.

This invention relates to vehicles and has special reference to a lumber truck.

Moreover the invention is an improvement on the prior patents in this line as evidenced by Patents 1,422,958, 1,457,025 and 1,480,257.

In the former patented lumber trucks a cylinder having a piston was located at each side of the truck both at the forward and rear ends thereof.

The principal objects of the present invention are to do away with these four cylinders; the piping complications resulting therefrom; the possible inequality of hoist due to unequal distribution of the load to be carried by each cylinder; and to substitute therefor a single cylinder actuating the entire load hoisting mechanism in a novel and improved manner.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of a machine constructed in accordance with the improved invention.

Figure 2 is a side view of the improved arrangement removed from the chassis.

Figure 3 is a plan view of the improved arrangement, the wheels and other lower parts of the device being omitted.

Figure 4 is an end view of one end of the lumber supporting mechanism, detached from the remainder of the apparatus, it being a section on the line 4—4 of Figure 2.

Figure 5 is an enlarged detail on the line 5—5 of Figure 2.

Figure 6:
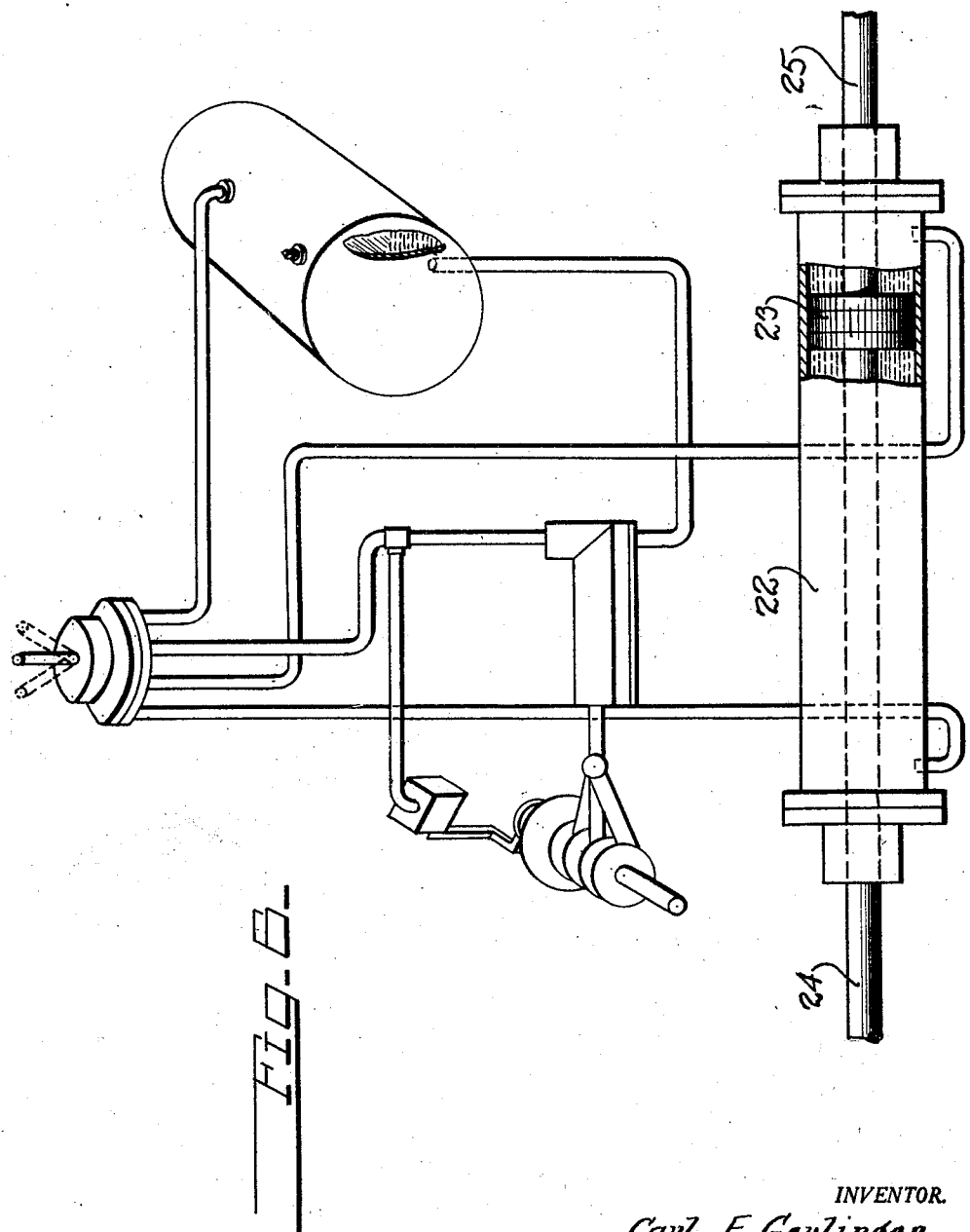
Figure 6 is an isometric view of the control apparatus.

In the present embodiment of the invention there is shown a chassis composed of an upper frame 10 and a lower frame 11 which are connected together by braces. At the forward end of this chassis there is provided the usual wheel 13 on each side and at the rear end there are provided, similarly wheels 14. These wheels are connected to the chassis by means of the spring supports 15 described in the prior application and, the rear wheels are driven by the previously described device comprising the rear sprockets 16, chain 17, sprocket wheel 18, chain 19 and sprocket wheel 20 which is driven from the engine 21.

Whereas, it has been heretofore known that the engine 21 could drive the compressor which would regulate the elevation of the chassis, through a plurality of pressure cylinders, the present invention provides for the elevation of the load carrying parts of the invention by means of a single cylinder. To the end there is provided a cylinder 22 having therein a piston 23. This piston is connected on each side to a piston rod one end of which is indicated at 24 and the other at 25. The piston rod 24 is connected to a bell crank lever 26 which, by means of a link 27, is connected to the upwardly projecting arrangement 28 of a load carrier 29. While there is but one of the rods 24, it is to be understood that the bell crank 26 is provided with a pair of arms 30 mounted on the shaft 31 and at each arm 30 is connected to a link 27.

Similarly the rod 25 is connected by a link 32 with an arm 33. Fixed on a shaft 34 which has a pair of arms 35 connected by links 36 to upwardly extending members of the lift frame 29 as indicated at 37.

Thus the motion of the piston 23 in one direction or the other elevates the lift frame 29 or depresses the same.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:—

1. In combination, a chassis, a hydraulic pump thereon, a single cylinder receiving fluid from said pump, lumber elevating mechanism at each end of the chassis and supported thereby, a piston in said cylinder, a piston rod extending through both ends of the cylinder and having the piston mounted thereon, operative connections between each end of said rod and the lumber elevating mechanisms at a respective end of said chassis.

2. In combination, a chassis, a hydraulic pump thereon, a single cylinder receiving fluid from said pump, lumber elevating mechanism at each end of the chassis and supported thereby, a piston in said cylinder, a piston rod extending through both ends of the cylinder and having the piston mounted thereon, rock shafts each journalled on said chassis to extend transversely thereof, a rock arm on each shaft, means operatively connecting each rock arm with a respective end of said rod, and other means operatively connecting each shaft with the lumber elevating mechanism at a respective end of the chassis.

3. In combination, a chassis, a hydraulic pump thereon, a single cylinder receiving fluid from said pump, lumber elevating mechanism at each end of the chassis and supported thereby, a piston in said cylinder, a piston rod extending through both ends of the cylinder and having the piston mounted thereon, rock shafts each journalled on said chassis to extend transversely thereof, a rock arm on each shaft, means operatively connecting each rock arm with a respective end of said rod, other rock arms on each shaft, and links connecting the last mentioned rock arms with the lumber elevating mechanisms.

In testimony whereof I affix my signature.

CARL F. GERLINGER.